(12) United States Patent
Hillen et al.

(10) Patent No.: US 10,076,078 B2
(45) Date of Patent: Sep. 18, 2018

(54) LATERAL SHAKE MECHANISM FOR AGRICULTURAL HARVESTER CLEANER

(71) Applicant: CNH Industrial America LLC, New Holland, PA (US)

(72) Inventors: Curtis F. Hillen, Lititz, PA (US); Willem De Coninck, Ninove (BE); Michiel J. Vanderstichele, Merkem (BE); Frank R. G. Duquesne, Zwevegem (BE); Jonas F. G. Deprauw, Lauwe (BE)

(73) Assignee: CNH Industrial America LLC, New Holland, PA (US)

( * ) Notice: Subject to any disclaimer, the term of this patent is extended or adjusted under 35 U.S.C. 154(b) by 91 days.

(21) Appl. No.: 15/223,969

(22) Filed: Jul. 29, 2016

(65) Prior Publication Data

US 2018/0027738 A1 Feb. 1, 2018

(51) Int. Cl.
  A01F 12/32 (2006.01)
  B07B 1/00 (2006.01)
  A01F 12/44 (2006.01)
  A01F 7/06 (2006.01)
  A01D 75/28 (2006.01)

(52) U.S. Cl.
  CPC .......... *A01F 12/446* (2013.01); *A01D 75/282* (2013.01); *A01F 7/06* (2013.01)

(58) Field of Classification Search
  CPC ..... A01D 75/282; A01F 12/448; A01F 12/32; A01F 12/44; A01F 12/446; A01F 12/00; B07B 1/28; B07B 1/42
  See application file for complete search history.

(56) References Cited

U.S. PATENT DOCUMENTS

| 2,262,453 | A | | 11/1941 | Dray | |
|---|---|---|---|---|---|
| 2,939,581 | A | * | 6/1960 | Ashton | A01F 12/44 209/26 |
| 3,744,631 | A | * | 7/1973 | Smith | B07B 1/28 209/319 |
| 4,344,443 | A | * | 8/1982 | De Busscher | A01D 75/282 460/150 |
| 4,535,788 | A | * | 8/1985 | Rowland-Hill | A01D 75/282 209/416 |
| 4,548,214 | A | * | 10/1985 | Sheehan | A01D 75/282 460/9 |
| 4,557,276 | A | * | 12/1985 | Hyman | A01D 75/285 209/416 |
| 4,598,718 | A | * | 7/1986 | Glaubitz | A01D 75/282 209/416 |

(Continued)

FOREIGN PATENT DOCUMENTS

DE 40 34 435 A1 4/1992
GB 1 484 436 9/1977

*Primary Examiner* — Arpad Fabian-Kovacs
(74) *Attorney, Agent, or Firm* — Patrick M. Sheldrake

(57) ABSTRACT

An agricultural harvester includes a grain processing section having a crop material handling assembly. The crop material handling assembly is driven in fore and aft oscillation by a device while permitting side to side movement. A pivotal link mechanism structurally connected to the crop material handling assembly midway between its side members and to the agricultural harvester chassis drives linear side to side movement of the crop material handling assembly while permitting fore and aft movement thereof.

21 Claims, 3 Drawing Sheets

(56) References Cited

U.S. PATENT DOCUMENTS

| | | | | |
|---|---|---|---|---|
| 4,897,071 | A | 1/1990 | Desnijder et al. | |
| 8,622,792 | B1* | 1/2014 | Murray | A01F 12/448 |
| | | | | 460/101 |
| 8,777,706 | B2* | 7/2014 | Farley | A01D 75/282 |
| | | | | 460/101 |
| 2005/0282601 | A1* | 12/2005 | Duquesne | A01D 75/282 |
| | | | | 460/101 |
| 2006/0229119 | A1* | 10/2006 | Wamhof | A01D 75/282 |
| | | | | 460/101 |
| 2008/0004092 | A1* | 1/2008 | Nelson | A01F 12/448 |
| | | | | 460/101 |
| 2008/0318650 | A1* | 12/2008 | Dhont | A01D 75/282 |
| | | | | 460/101 |
| 2010/0016044 | A1* | 1/2010 | Adamson | A01F 12/448 |
| | | | | 460/101 |
| 2013/0109450 | A1* | 5/2013 | Puvak | A01F 12/32 |
| | | | | 460/101 |
| 2013/0158816 | A1* | 6/2013 | Murray | A01F 12/448 |
| | | | | 701/50 |
| 2014/0171163 | A1* | 6/2014 | Murray | A01F 12/448 |
| | | | | 460/101 |
| 2014/0179381 | A1* | 6/2014 | Murray | A01F 12/448 |
| | | | | 460/101 |
| 2015/0080070 | A1* | 3/2015 | Johnson | A01F 12/448 |
| | | | | 460/5 |
| 2016/0029562 | A1* | 2/2016 | De Smet | A01F 12/32 |
| | | | | 460/1 |
| 2017/0086380 | A1* | 3/2017 | Walter | A01D 41/12 |

\* cited by examiner

LATERAL SHAKE MECHANISM FOR AGRICULTURAL HARVESTER CLEANER

BACKGROUND OF THE INVENTION

1. Field of the Invention

The present invention relates to agricultural harvesters such as combines, and, more particularly, to shaker mechanisms incorporated in the harvester crop processing section.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating grain handlings to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself The cleaning system further separates the grain from non-grain crop material, and typically includes a fan directing an air flow stream upwardly and rearwardly through vertically arranged grain handlings which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly is discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve or sieve assembly is driven for fore and aft movement to move the harvested crop material in an aft direction but at the same time separate the remaining grain or crop from the non-crop material. The sieve assembly presents a significant weight having inertia forces that require structurally strong supports to secure the sieve assembly in the agricultural frame but at the same time enable driven fore and aft movement. A further complication arises in that, when the agricultural harvester is on the side of a slope, it requires side to side movement of the sieve assembly so as to prevent clogging of the material and resultant reduction in efficiency. The side to side movement is used generally selectively so that the continuous primary movement is fore and aft but the structural connection must also permit side to side movement of the sieve assembly.

Typically, the side to side movement is generated by an actuator that is connected to a frame member of the agricultural harvester to the side of the sieve assembly. This causes the sieve assembly to achieve a side to side oscillation but introduces complications. The structural forces must be transmitted from the side frame member closest to the actuator to the opposite side frame member and other structural elements of the sieve assembly. As a result, the structural interconnections must be more robust on the side of the sieve assembly closest to the actuator. This adds additional complication in the design of the sieve assembly, owing to the fact that additional reinforcements are necessary for the suspension bushings and other elements making up the sieve assembly.

Another problem is that since there is a substantial air flow along and through the sieve assembly, the asymmetric nature of the structural elements which are underneath the grain contacting surface of the sieve assembly cause a difference in the air flow which in turn may cause problems with distribution of the crop material.

Another problem with the provision of a side shaker arrangement is that the ground support, in the form of tires for an agricultural harvester, have a significant claim on the space alongside the sieve assembly, especially when the agricultural harvester is called to negotiate tight terms. As a result, the actuator and linkage have a conflicting claim on the outside envelope of the sieve assembly.

Accordingly, what is needed in the art is a side to side oscillation mechanism that minimizes if not eliminates the asymmetry and associated problems in an agricultural harvester.

SUMMARY OF THE INVENTION

The present invention seeks to oscillate a crop material handling assembly in a fore and aft direction but at the same time permit side to side movement with a symmetric drive mechanism.

In one form, the invention is a crop material handling assembly for an agricultural harvester. The crop material handling assembly includes a right side frame member and a left side frame member interconnected by at least one cross frame. Front and rear supports are provided for the right and left side members permitting fore and aft movement and side to side movement. A device drives fore and aft oscillation of the right and left side members. A pivotal link mechanism is structurally connected to the at least one cross frame between the right and the left side members for driving side to side movement of the crop material handling assembly. An actuator for selectively driving the pivotal link mechanism is connected to one of the crop material handling assembly and the agricultural harvester chassis between the right and left side members.

In another form, the invention is an agricultural harvester with a chassis, a plurality of wheels for ground movement and grain processing equipment mounted on the chassis. A crop material handling assembly receives material from the grain processing equipment and includes a right side member and a left side member interconnected by at least on cross frame. Front and rear supports for the right and left side members connect to the chassis for permitting fore and aft movement and side to side movement. A device drives fore and aft oscillation of the right and left side members. A pivotal link mechanism is structurally connected to the at least one cross frame between the right and the left side members for driving side to side movement of the crop material handling assembly. An actuator for selectively driving the pivotal link mechanism is connected to one of the crop material handling assembly and the agricultural harvester chassis between the right and left side members.

An advantage of the present invention is a symmetric side to side shaker mechanism for the crop material handling assembly of an agricultural harvester.

Another advantage is a reduction in the space need on the side of a crop material handling assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
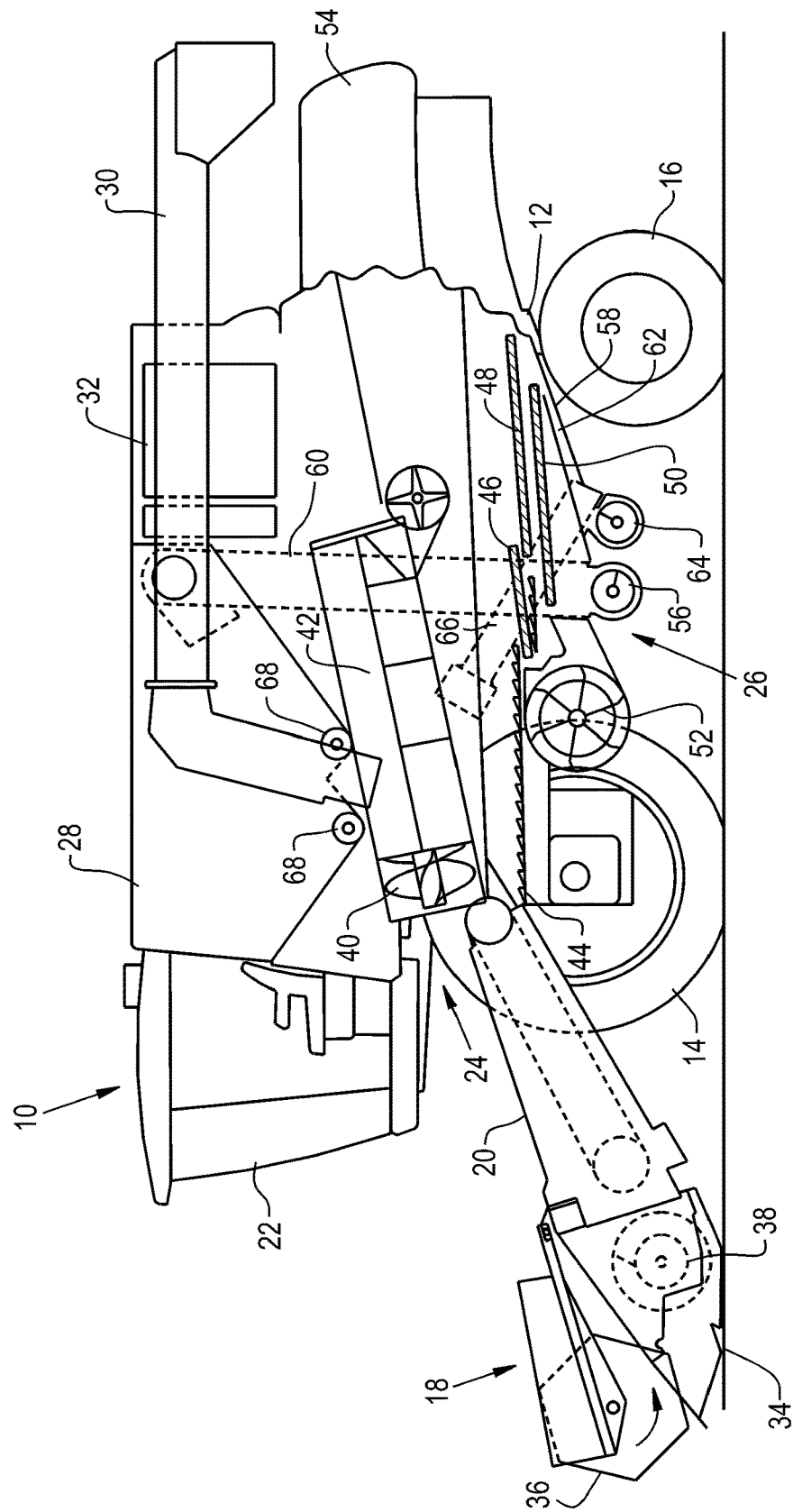
FIG. 1 is a side view of an embodiment of an agricultural harvester in the form of a combine which may include a sieve assembly and drive arm of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
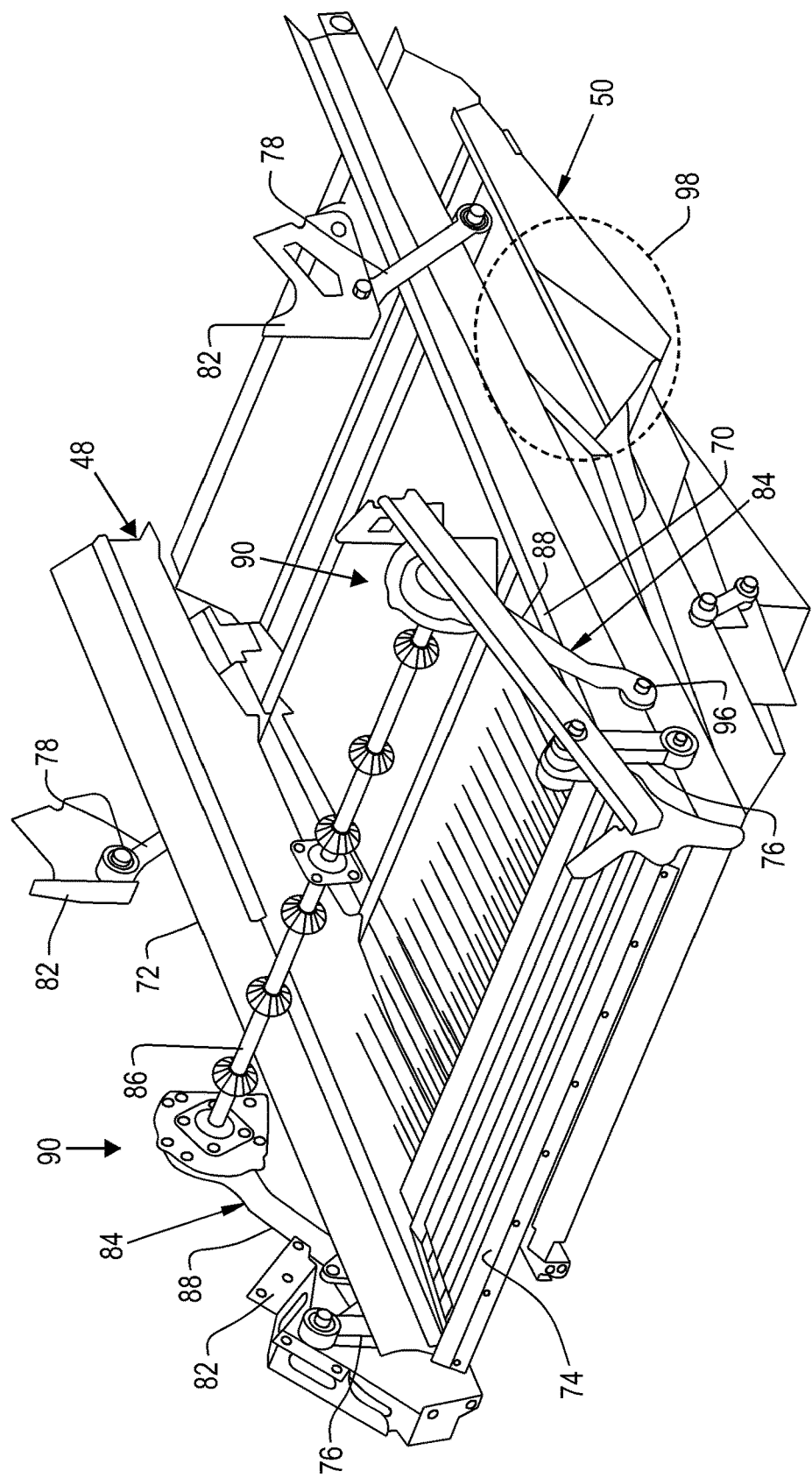
FIG. 2 is a perspective view of the sieve assembly shown in FIG. 1.

Referring now to FIG. 2, the upper and lower sieves or sieve assemblies 48 and 50 are shown without the sieves. The upper sieve assembly 48 includes a left side member 70 and a right side member 72 interconnected by at least one cross frame 74. The left and right side members 70 and 72 are supported adjacent the cross frame 74 by a front link 76. A flexible link 78 connects to a rear support to maintain the rear of the side members in place. Links 76 and 78 have flexible mounting points 96 to enable both fore and aft and side to side movement. Support frames 82 provide a base affixed to the chassis 12 to provide ultimate support for the sieve assembly 48. A sieve extends between right and left side member 70 and 72 to provide a surface for carrying material in an aft direction and permit grain or other crop material to drop through and be collected. The sieve is not shown to enable a clearer description of the present invention.

The front of the left and right side members 70 and 72 is driven to fore and aft movement through a fore and aft oscillation mechanism generally indicated at 84. An input drive shaft 86 extending transverse in chassis 12 receives a suitable power input for rotation. Both ends of drive shaft drive 86 reciprocate arms 88 through an eccentric rotatable mounting 90. Arms 88 connect to the left and right side members 70, 72 through flexible connections 96.

In the prior art, the left and right side members 70 and 72 are selectively reciprocated from side to side by a side shaker mechanism that is generally indicated at location 98 to the side of the left side member 70. The mechanism would include a reciprocating actuator appropriately mounted to the chassis 12 and having an output shaft connecting to left side member 70 by a pivotal connection for side to side movement. As stated above, provision of the side to side shaker mechanism at the location 98 introduces a space or envelope claim to the side of the grain processing equipment. This location causes asymmetry in the transmission of forces to the left and right side members as well as potentially interfering with the ground drive wheels positioned adjacent the side of the crop material handling equipment. In accordance with the present invention, the side to side shaker mechanism is shifted to the center of the crop material handling equipment as illustrated in FIGS. 3 and 4.

Figure 3:
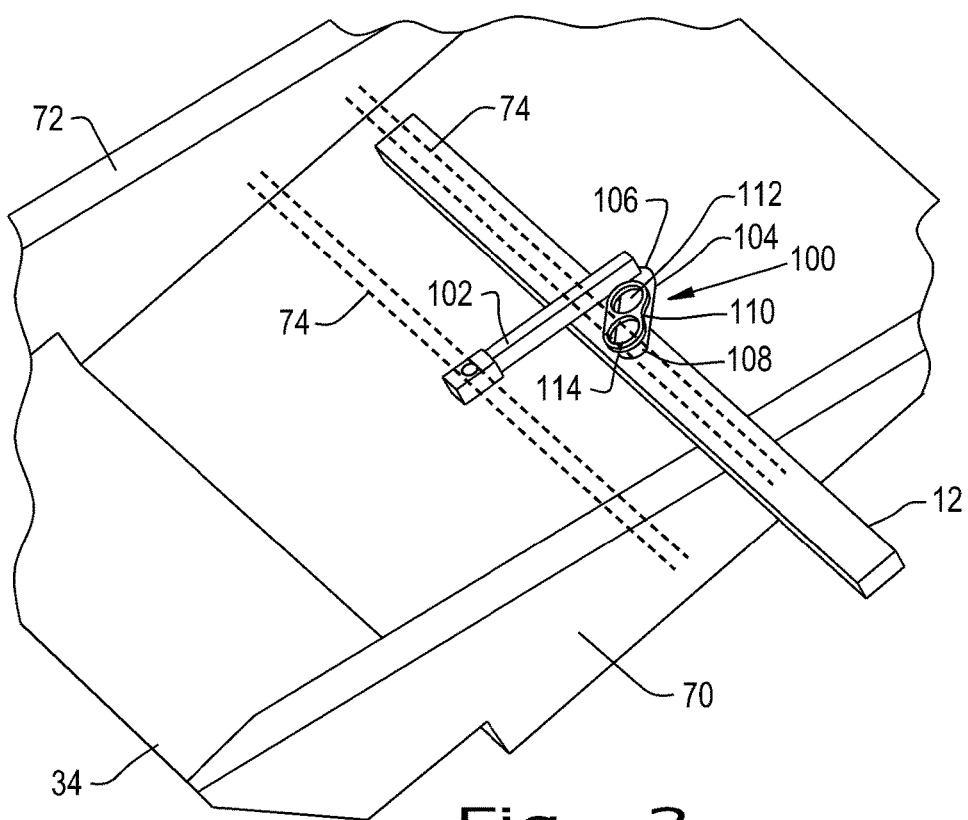
FIG. 3 is a view of one version of a drive arm embodying the present invention for the sieve of FIG. 2; and, FIG. 4 is a view of another version of a drive arm embodying the present invention for the sieve of FIG. 2.

Referring first to FIG. 3, there is shown a pivotal link mechanism 100 and an actuator 102 having one end connected to one of the cross frames 74 (shown in dashed lines) connected to the shaking member through left and right side members 70, 72 and the output end connected to a first link 104 at one end 106 thereof. The opposite end 108 of the first link is connected to the chassis 12. A second link 110 has a first end 112 pivotally connected to the first link 104 between its ends and a second end 114 connected to the cross frame 74 (shown in dashed lines) connected to the shaking member through left and right side members 70, 72.

Actuator 102 may be in the form of an electric, pneumatic or hydraulic actuator as is appropriate. The point of connection to the cross frame 74 at 114 is preferably midway between left and right side members 70 and 72 and midway between the fore and aft ends of the slag left and right side members 70 and 72. In operation, reciprocation by the actuator 102 of the end 106 of link 104 causes a corresponding movement at the end 114 connecting to the cross frame 74 that is a linear reciprocation as opposed to some prior art proposals having arcuate reciprocation. The linear movement is effective in increasing the efficiency with which the grain between the left and right side members 70 and 72 is redistributed. By positioning the actuator 102 and pivotal link mechanism 100 between the left and right side members 70 and 72, space to the side of the members is freed up to enable greater clearance for ground drive wheels and other equipment. Furthermore, the distribution of stresses from the actuating mechanism to the left and right side frame members 70 and 72 is made symmetrical so that one side does not have to be overly rigid relative to the other side. This enables symmetry of the cross frame members 74 about the longitudinal midpoint of the crop material handling assembly. This in turn enables a smoother and more uniform flow from the blower 52 to sweep the material other than grain along the top of the sieve.

Figure 4:
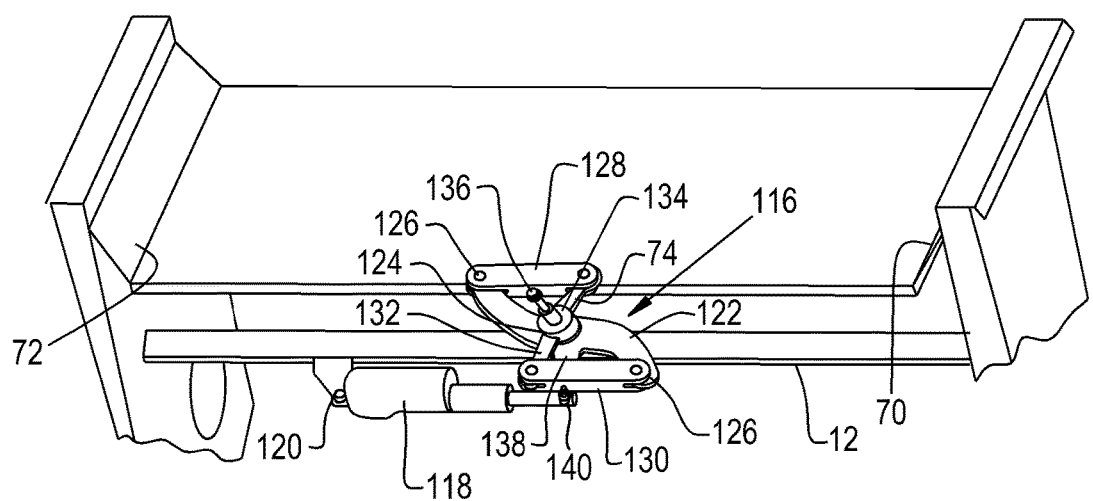

Referring now to FIG. 4, there is shown another pivotal link mechanism 116 driven by an actuator 118 that is connected to chassis member 12 through a pivotal connection 120. The actuator 118 connects to a bell crank 122 pivotally mounted to chassis 12 at 124. The bell crank 122 has opposed ends 126. First and second pivotal links 128 and 130 are connected to the opposed ends of bell crank 126. As illustrated, the links 128 and 130 are arranged in pairs to balance the forces. The opposite ends of first and second links 128 and 130 are connected to a third link 132 having a connecting post 134 extending up to a cross frame (not shown) that connects to left and right side members 70, 72 and fastened to it by a screw 136. A crank arm 138 is integral with bell crank 122 and extends at an angle relative to a line between the bell crank opposed ends 126 for connection to the actuator output at 140.

The embodiment shown in FIG. 4 utilizes an arrangement that is advantageous from a packaging standpoint, in that the actuator 118 is parallel to and closely adjacent the chassis member 12. The movement of connecting post 134 and hence the left and right side frame members 70 and 72 is also in generally a linear motion which is advantageous to the distribution of grain and other material during the separating process. As in the case with the arrangement in FIG. 3, the point of connection with the cross frames 74 is midway between the left and right side frame members and is positioned midway between the fore and aft arrangement. This also offers the advantage of the symmetrical distribution of forces, symmetrical management of air flow and freeing up the side of the grain processing equipment to make greater clearance for ground drive wheels.

Although sieve assemblies have been used in the above example of the lateral shake mechanism, it should be understood that it may be applied to a grain pan, return pan, chaff pan, lower shoe or any grain or crop material handling assembly in an agricultural harvester with equal benefits of symmetrical force distribution and freeing up the side of the assembly.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A crop material handling assembly for an agricultural harvester, said crop material handling assembly comprising:

a right and a left side member interconnected by at least one cross frame;

front and rear supports for said right and left side members, permitting fore and aft oscillation and side to side movement;

a device for driving fore and aft oscillation of said right and left side members;

a pivotal link mechanism structurally connected to said at least one cross frame between said right and left side frame members and to the agricultural harvester chassis for driving side to side movement of said crop material handling assembly while permitting fore and aft movement thereof, said pivotal link mechanism having at least two pivotal connections; and an actuator for selectively driving said pivotal link mechanism, said actuator being connected to one of said crop material handling assembly and the agricultural harvester chassis between said right and left side members.

2. A crop material handling assembly for an agricultural harvester as claimed in claim 1, wherein said pivotal link mechanism is connected to said at least one cross frame substantially midway between said right and left side members.

3. The crop material handling assembly as claimed in claim 1, wherein said pivotal link mechanism is connected to said at least one cross frame at a point that is substantially halfway between the fore and aft ends of said right and left side frame members.

4. The crop material handling assembly as claimed in claim 1, wherein said actuator is connected to the agricultural harvester chassis.

5. The crop material handling assembly as claimed in claim 1, wherein said actuator is connected to said at least one cross frame.

6. The crop material handling assembly as claimed in claim 5, wherein said pivotal link mechanism includes a first link pivotally connected to said actuator at one end and to said chassis at the other end and a second link pivotally connected to said first link at a point in between its pivotal connection and at the other end to substantially the midpoint of said at least one cross frame.

7. The crop material handling assembly as claimed in claim 1, wherein said at least one cross frame is structurally symmetrical with reference to a point midway between said right and left side members.

8. The crop material handling assembly as claimed in claim 7, wherein said actuator and pivotal link mechanism are positioned underneath said at least one cross frame.

9. The crop material handling assembly as claimed in claim 5, wherein said pivotal link mechanism includes a bell crank pivotally mounted at a point intermediate its ends to the agricultural harvester chassis with opposed ends and a crank arm extending at an angle relative to said opposed ends and connected to said actuator.

10. The crop material handling assembly as claimed in claim 9, including first and second links pivotally connected to said opposed ends of said bell crank and a third link pivotally connected to the opposite ends of said first and second links, said third link being pivotally connected between its ends to said at least one cross frame.

11. A harvester comprising:
a chassis;
a plurality of mobile wheels for ground movement mounted on said chassis;

grain processing equipment mounted on said chassis;

a crop material handling assembly comprising a right side and a left side member interconnected by at least one cross frame, front and rear supports for said right and left side members, said front and rear supports mounted on said chassis for permitting fore and aft oscillation and side to side movement of said right and left side members;

a device mounted on said chassis for driving fore and aft oscillation of said right and left side members;

a pivotal link mechanism structurally connected to said at least one cross frame between said right and left side frame members and to the agricultural harvester chassis for driving side to side movement of said crop material handling assembly while permitting fore and aft movement thereof said pivotal links mechanism having at least two pivotal connections; and an actuator for selectively driving said pivotal link mechanism, said actuator connected to one of said crop material handling assembly and said agricultural harvester chassis between said right and left side members.

12. The harvester as claimed in claim 11, wherein said pivotal link mechanism is connected to said at least one cross frame midway between said right and left side members.

13. The harvester as claimed in claim 11, wherein said pivotal link mechanism is connected to said at least one cross frame at a point that is midway between the fore and aft ends of said right and left side members.

14. The harvester as claimed in claim 11, wherein said actuator is connected to the agricultural harvester chassis.

15. The harvester as claimed in claim 11, wherein said actuator is connected to said at least one cross frame.

16. The harvester as claimed in claim 15, further comprising a first lever pivotally connected to said actuator at one end and to said at least one cross frame at the other end and a second arm pivotally connected to said first arm at a point in between its pivotal connections and at the other end to the midpoint of said at least one cross frame.

17. The harvester as claimed in claim 11, wherein said at least one cross frame is structurally symmetrical with reference to a point midway between said right and left side members.

18. The harvester as claimed in claim 11, wherein said actuator and pivotal link mechanism are positioned underneath said at least one cross frame.

19. The harvester as claimed in claim 14, wherein said pivotal link mechanism includes a bell crank pivotally mounted to said chassis and having opposed ends and a crank arm extending at an angle relative to said opposed ends and connected to said actuator.

20. The harvester as claimed in claim 19, further comprising first and second links pivotally connected to the opposed ends of said bell crank and a third link pivotally connected to the opposite ends of said first and second links and connected between its ends to said at least one cross frame.

21. The harvester as claimed in claim 11 wherein said pivotal link mechanism drives linear side to side movement of said crop material handling assembly.

* * * * *